Patented Mar. 14, 1950

2,500,260

UNITED STATES PATENT OFFICE 2,500,260

METHOD FOR THE PREPARATION OF FUMARIC ACID

Lawrence W. Newton, South Charleston, W. Va., assignor, by mesne assignments, to Union Carbide and Carbon Corporation, a corporation of New York No Drawing. Application May 8, 1948, Serial No. 25,997

3 Claims. (Cl. 260—537)

This invention relates to the formation of fumaric acid from maleic acid.

The conversion by isomerization of maleic acid to fumaric acid has been the subject of academic interest for many years, and several ways of operating this reaction on an industrial scale are known. These industrial methods involve heating aqueous solutions of maleic acid in the presence of various catalysts.

It has been found that maleic acid may be converted to fumaric acid under anhydrous conditions by dissolving the maleic acid in molten maleic anhydride and heating. Under these conditions very little, if any, malic acid, the addition product of water and maleic acid, is formed. When molten maleic acid is heated alone, however, malic acid is always found as a by-product in addition to fumaric acid. It has been discovered, also, that fumaric acid is only slightly soluble in molten maleic anhydride, while maleic acid is very soluble in this anhydride, so that the fumaric acid precipitates as formed. The precipitated fumaric acid may be recovered either by filtering or centrifuging the molten dispersion.

As the isomerization of maleic acid to fumaric acid is exothermic, the presence of the molten maleic anhydride also serves to control the reaction thermally as well as chemically. The chemical control is exerted by repressing the formation of malic acid in the reaction. The concentration of maleic acid in the molten maleic anhydride may conveniently be varied from 10 to 70% by weight of the mixture, although a concentration of about 50% by weight is preferred. The maleic acid may be formed in situ by adding the required amount of water to the maleic anhydride.

The process is well adapted for continuous operation. In one method of operating the process continuously, equimolar amounts of maleic anhydride and water are fed continuously to a vessel containing molten maleic anhydride; the water and maleic anhydride reacting to form a solution of maleic acid in the molten maleic anhydride. The vessel is heated at a temperature of 100° C. to 200° or 250° C. and the maleic acid transformed to fumaric acid, which precipitates as formed. The concentration of fumaric acid is maintained at a point where the molten dispersion is readily fluid, say 15 to 30% solids as fumaric acid, and a portion of the slurry is continuously withdrawn. This slurry is filtered at a temperature above the melting point of maleic anhydride, 52° C., and the molten maleic anhydride mother liquid recycled. The filter cake is washed with a regulated amount of water to dissolve out mechanically retained maleic acid and maleic anhydride. The wash water is added to the reaction as the water needed to react with the maleic anhydride added to form maleic acid.

The following examples will illustrate the invention:

Example 1

Maleic acid was dissolved in molten maleic anhydride to form a 50% solution by weight, and this solution was heated at 130° C. for 16 hours in a heat-resistant glass pressure bottle. At the end of the reaction, the hot dispersion of precipitated fumaric acid was filtered. The yield of fumaric acid recovered amounted to 79.7% based on the maleic acid charged.

Example 2

A heat-resistant glass flask equipped with a stirrer and reflux condenser was charged with 500 grams of maleic acid and 500 grams of maleic anhydride. The charge was heated at 160 to 180° C. for two hours. The precipitated fumaric acid was recovered from the reaction mixture by filtering it at 70 to 90° C. The fumaric acid filter cake was washed with water and after drying, amounted to 342 grams, representing a yield of 68.4% based on the maleic acid charged.

To simulate continuous operation, the molten maleic anhydride filtrate was recharged to the flask, along with water and additional maleic anhydride to form make-up maleic acid. This cycle was repeated for a total of ten runs, each run being conducted for 2.5 hours at 160 to 180° C. The amount of water added per pass varied from 80 to 101 grams, the total for the ten runs being 887 grams, and the amount of maleic anhydride added per pass varied from 500 to 1000 grams, the total for the ten runs being 6022 grams. The conversion of maleic acid, based on the total amount present, to fumaric acid per pass varied from 40 to 60%, depending on the amount of water and maleic anhydride added in each run. The fumaric acid was filtered out after each run, and the total collected was 5267 grams. The yield of fumaric acid based on the total water added plus the residual maleic acid from the original run was 90.0%, and the yield based on the maleic anhydride added, which was in molar excess of the water, was 73.8% and, taking credit for recovered maleic acid and maleic anhydride the efficiency of converting maleic acid to fumaric acid by the method was 95.4%. The actual efficiency was higher as there was some mechanical loss of fumaric acid.

What is claimed is:

1. Process of converting maleic acid to fumaric acid which comprises heating in a closed system under anhydrous conditions a solution of maleic acid in molten maleic anhydride containing from 10 to 70% by weight of the maleic acid at a temperature from 100° C. to 250° C., forming a mixture of precipitated fumaric acid with the molten maleic anhydride, and separating fumaric acid from said mixture.

2. Process of converting maleic acid to fumaric acid which comprises heating in a closed system under anhydrous conditions a solution of maleic acid in molten maleic anhydride containing from 40 to 60% by weight of the maleic acid at a temperature from 130° to 180° C., forming a mixture of precipitated fumaric acid with the molten maleic anhydride, and separating fumaric acid from said mixture.

3. Process of converting maleic acid to fumaric acid which comprises heating in a closed system under anhydrous conditions a solution of maleic acid in molten maleic anhydride containing from 10 to 70% by weight of the maleic acid at a temperature of 100 to 200° C., forming a mixture of precipitated fumaric acid with the molten maleic anhydride, separating the precipitated fumaric acid and the maleic anhydride from said mixture, washing the separated fumaric acid with a regulated amount of water, and combining the wash water and an approximately equimolar amount of maleic anhydride in relation to the wash water together with the separated maleic anhydride to repeat the conversion of maleic acid to fumaric acid.

LAWRENCE W. NEWTON.

REFERENCES CITED

The following references are of record in the file of this patent:

UNITED STATES PATENTS

| Number | Name | Date |
|---|---|---|
| 1,966,852 | Dvornikoff | July 17, 1934 |
| 2,441,238 | Dunlop | May 11, 1948 |